United States Patent
Hwang et al.

(10) Patent No.: US 7,532,694 B2
(45) Date of Patent: May 12, 2009

(54) APPARATUS AND METHOD FOR COMPENSATING FOR DISTORTION CAUSED BY A PHASE SLEW OF A FRAME REFERENCE SIGNAL IN AN ASYNCHRONOUS WIDEBAND CODE DIVISION MULTIPLE ACCESS COMMUNICATION SYSTEM

(75) Inventors: Seung-Joong Hwang, Suwon-si (KR); Doo-Hyeon Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 10/936,720

(22) Filed: Sep. 9, 2004

(65) Prior Publication Data

US 2005/0089086 A1   Apr. 28, 2005

(30) Foreign Application Priority Data

Sep. 9, 2003   (KR) ...................... 10-2003-0063187

(51) Int. Cl.
*H04L 7/00* (2006.01)
(52) U.S. Cl. ...................................... 375/371; 375/349
(58) Field of Classification Search ................ 375/371, 375/349
See application file for complete search history.

(56) References Cited

U.S. PATENT DOCUMENTS

| | | | | |
|---|---|---|---|---|
| 5,479,448 | A | * | 12/1995 | Seshadri ...................... 375/267 |
| 6,359,875 | B1 | * | 3/2002 | Hamada et al. .............. 370/342 |
| 6,868,111 | B1 | * | 3/2005 | Oleynik ....................... 375/145 |
| 2002/0016158 | A1 | * | 2/2002 | Shibuya et al. ........... 455/232.1 |
| 2003/0174780 | A1 | * | 9/2003 | Heikkila ...................... 375/259 |
| 2005/0032483 | A1 | * | 2/2005 | Klomsdorf et al. .......... 455/110 |

* cited by examiner

*Primary Examiner*—Kevin Y Kim
(74) *Attorney, Agent, or Firm*—Roylance, Abrams, Berdo & Goodman, L.L.P.

(57) ABSTRACT

An apparatus and method for compensating for data distortion caused by the phase slew of a frame reference signal in a User Equipment (UE) that accesses an asynchronous Wideband Code Division Multiple Access (WCDMA) communication system are provided. In the distortion compensating apparatus, an Finite Impulse Response (FIR) filter receives I channel data and Q channel data, each of the I and Q channel data having a plurality of chips, multiplies the I/Q channel data by a predetermined filtering coefficient, and outputs the product, in synchronization with the frame reference signal. A phase compensator compensates for an I-Q channel exchange occurring at an output end of the FIR filter when the phase of the frame reference signal is advanced or retarded.

12 Claims, 10 Drawing Sheets

APPARATUS AND METHOD FOR COMPENSATING FOR DISTORTION CAUSED BY A PHASE SLEW OF A FRAME REFERENCE SIGNAL IN AN ASYNCHRONOUS WIDEBAND CODE DIVISION MULTIPLE ACCESS COMMUNICATION SYSTEM

PRIORITY

This application claims priority under 35 U.S.C. § 119 to an application entitled "Apparatus and Method for Compensating for Distortion Caused by Phase Slew of Frame Reference Signal in an Asynchronous Wideband Code Division Multiple Access Communication System" filed in the Korean Intellectual Property Office on Sep. 9, 2003 and assigned Ser. No. 2003-63187, the contents of which are incorporated herein by reference.

BACKGROUND OF THE INVENTION

1. Field of the Invention

The present invention relates generally to a user equipment (UE) in an asynchronous Wideband Code Division Multiple Access (WCDMA) communication system, and in particular, to an apparatus and method for compensating for distortion caused by the phase slew of a frame reference signal in the output of a Finite Impulse Response (FIR) filter.

2. Description of the Related Art

Universal Mobile Telecommunication Service (UMTS), a third generation mobile communication system based on European asynchronous mobile communication systems, Global System for Mobile communications (GSM), and General Packet Radio Services (GPRS), consistently provides a service that allows mobile subscribers and computer users to transmit packet-based text, digital voice and video data, and multimedia data at or above 2 Mbps all over the world. With the introduction of virtual connection, which is defined as a packet-switched connection using a packet protocol e.g., an Internet protocol (IP), UMTS promises a connection to any end point in the network.

Since Code Division Multiple Access (CDMA) performs digital processes including user identification and coding/decoding in small units of data called a chip (e.g., for a chip rate of 1.2299 Mcps, one chip is 813.8 ns in duration), synchronization between a base station and a mobile station is very important. A synchronous mobile communication system synchronizes base stations using GPS receivers. In comparison, an asynchronous mobile communication system like UMTS is characterized by asynchronous Node Bs and the sharing of the same timing information between a Node B and User Equipments (UEs) in a cell associated with the Node B. UE, which accesses the Wideband Code Division Multiple Access (WCDMA) system, transmits or receives data according to reception and transmission (Rx and Tx) frame reference signals from a corresponding Node B.

FIG. 1 is a timing diagram illustrating an example of Tx and Rx frame reference signals in UE that accesses a conventional asynchronous CDMA communication system.

Referring to FIG. 1, Rx and Tx frame reference signals 102 and 104, respectively, are generated every radio frame of 10 ms. To accurately detect signals when it moves from one cell to another cell, the UE maintains timing that offers the best reception rate by advancing or retarding the Rx frame reference signal 102 by a predetermined reference chip unit, usually a ⅛ chip. Reference numerals 106 and 110 denote the advanced Rx frame reference signal and the retarded Rx frame reference signal, respectively. The Tx frame reference signal 104 is advanced or retarded by the same amount (e.g., a predetermined reference chip unit such as a ⅛ chip) because a 1024-chip interval is kept between the Rx frame reference signal 102 and the Tx frame reference signal 104. Reference numerals 108 and 112 denote the advanced Tx frame reference signal and the retarded Tx frame reference signal, respectively. In the UE, therefore, a receiver notifies a modulator of a transmitter of an advanced or retarded point of the Rx frame reference signal 102 in units of reference chips, so that the Tx frame reference signal 104 can compensate for the reference chips.

FIG. 2 is a block diagram illustrating an example of a digital modulator in the UE that accesses the conventional asynchronous CDMA communication system.

Referring to FIG. 2, a digital modulator 200 comprises a channelization code spreader 206 for multiplying Dedicated Physical Data Channel (DPDCH) traffic data 202 and Dedicated Physical Control Channel (DPCCH) control data 204 by a predetermined spreading code, a gain controller 208 for multiplying the spread data by a predetermined gain G, a scrambling code spreader 210 for scrambling the gain-controlled data by multiplying it by a predetermined scrambling code, and an Square Root Raised Cosine (SRRC) filter 212 for outputting I and Q channel transmission data, TX_DATA_I and TX_DATA_Q by limiting the bandwidth of the scrambled signal and suppressing interference from adjacent frequency channels.

The channelization code spreader 206, the gain controller 208, and the scrambling code spreader 210 process data at a 1-chip sampling rate, while the SRRC filter 212 processes data at a ¼-chip sampling rate. Since the SRRC filter 212 outputs 4 over-samples per chip, it is influenced by the phase slew of the Tx frame reference signal. Therefore, the SRRC filter 212 needs to compensate for timing affected by the phase slew of the Tx frame reference signal.

Uplink DPCCH and DPDCH data all use the same frame timing. The DPCCH/DPDCH frame transmission occurs 1024 chips after a signal is detected in the first DPCCH/DPDCH detected path on a corresponding downlink. If the reference timing is changed, the UE advances or retards the Tx frame reference signal with a resolution of a ⅛ chip every 140 ms, thereby slowly compensating for timing differences. The ⅛ chip is a reference chip unit by which the phase of the frame reference signal is slewed.

The SRRC filter 212 is an FIR filter usually used in a communication device adopting a digital modulation such as Phase Shift Keying (PSK) or Quadrature Amplitude Modulation (QAM). Real-time processing in the SRRC filter 212 is very important because the final output of the SRRC filter 212 is transmitted to an analog stage via a digital to analog converter (DAC). For application of the SRRC filter 212 to an asynchronous CDMA communication system, ⅛ chip-based timing compensation is essential.

The 48-tap SRRC filter 212 includes 48 delays, 48 multipliers, and a summer for summing the 48 products in the conventional asynchronous WCDMA communication system. The implementation of all these devices in the UE occupies too much hardware space. Thus, a UE designer usually reduces the number of filtering taps by using calculator sharing and time sharing.

FIG. 3 is a block diagram illustrating an example of the structure of a conventional SRRC filter. Referring to FIG. 3, an SRRC filter 300 includes serially-connected delays 302, 304, 306, 308 and 310 each for delaying in-phase (I channel) data, I_CH_DATA by one chip, serially-connected delays 312, 314, 316, 318 and 320 each for delaying quadrature-phase (Q channel) data, Q_CH_data by one chip, multiplexers (MUXs) 322, 324, 326, 328 and 330 each for selecting I or Q channel data every ⅛ chip, a coefficient MUX 342 for selecting a filtering coefficient for the selected I/Q channel data every ¼ chip, 4-pipeline multipliers 332, 334, 336 and 340 each for multiplying the selected I/Q channel data by the selected coefficient, a 3-pipe line summer 344 for summing the outputs of the multipliers 332, 334, 336 and 340, a selector 346 for alternately selecting the I and Q channel sums every ⅛ chip, and a delay 348 for delaying the I channel data received from the selector 346 by a ⅛ chip so that the final I and Q channel values, FILTER_OUTPUT_I and FILTER_OUTPUT_Q can be output at the same time.

As illustrated in FIG. 1, a minimum signal processing unit time is 10 ms in the WCDMA system. Hence, it is important to detect the boundary of a 10-ms radio frame. To control the SRRC filter 300 having the above-described configuration, ⅛ chip-based count signals synchronized with a frame reference signal are required. Thus, the SRRC filter 300 generates a ⅛ chip count value, CHIP×8_COUNT using a ⅛ chip (CHIP×8) counter 350. CHIP×8_COUNT ranges from 0 to 307199, to detect the boundary of a 10 ms-frame.

Using CHIP×8_COUNT from the CHIP×8 counter 350, count signals, CHIP×8_COUNT[0], [1], [2] can be generated for the SRRC filter 300. Since the lower 3 bits of CHIP× 8_COUNT can be used as a 1 chip-based count value, the MUXs 322, 324, 326, 328 and 330 use the least significant bit (LSB) of the ⅛ chip count, CHIP×8_COUNT[0] as a select signal and the MUX 342 uses the second and third LSBs of the ⅛ chip count, CHIP×8_COUNT [1], [2] as select signals.

As mentioned earlier, due to the 1024-chip interval between the Rx frame reference signal for the downlink DPDCH and DPCCH and the Tx frame reference signal for the uplink, if the Rx frame reference signal is advanced or retarded (i.e. phase slew) along the time axis, the Tx frame reference signal is also moved the same amount to maintain the 1024-chip interval.

Although CHIP×8_COUNT is increased by 1 every ⅛ chip, it is increased by 2 in the case of a phase advance, and kept unchanged in the case of a phase retardation. Then, the MUXs 322, 324, 326, 328 and 330 may select I and Q channel data in a wrong order (e.g. I, Q, I, Q, Q, I, Q, I, . . . ). Moreover, because all multiplications and additions for SRRC filtering cannot be performed for a ⅛ chip, a pipeline structure having a length of 1 chip must be used and thus the selector 346 exchanges I and Q channel data in relation to the previous input. These two phenomenons cause I/Q output distortion for one chip.

FIG. 4 is a timing diagram illustrating an example of an output distortion when a phase advance in the conventional SRRC filter occurs, particularly a timing of a signal in each logic experiencing an exchange between I and Q outputs for 1 chip when a ⅛ chip phase advance occurs. For conciseness, the input timing of I_CH_DATA and Q_CH_DATA, the delay timing of the I and Q channel delays 302 and 312, the output timing of the MUX 322; the output timing of the MUX 342, the multiplication timing of the 4-pipeline multiplier 332 in each pipeline stage, the summation timing of the 3-pipeline summer 344 in each pipeline stage, and the output timing of the delay 348 after the selector 346 are shown in units of a ⅛ chip cycle.

Referring to FIG. 4, at the phase advance, CHIP× 8_COUNT[2:0] jumps from 0 to 2. As I and Q channel data are exchanged in the MUX 322, Q_1, I_2, I_2, I_2, Q_2, I_2, Q_2, . . . and pass through the pipelines of the multiplier 332 and the summer 344 for 1 chip, the selector 346 produces I and Q channel data in an exchanged order, thereby leading to a 1-chip output distortion. That is, FILTER_OUTPUT_I and FILTER_OUTPUT_Q are exchanged for 1 chip, as indicated in black stripes.

FIG. 5 is a timing diagram illustrating an example of an output distortion when a phase retardation in the conventional SRRC filter occurs, particularly a timing of a signal in each logic experiencing an exchange between I and Q outputs for 1 chip when a ⅛ chip phase retardation occurs. Referring to FIG. 5, at the phase retardation, CHIP×8_COUNT[2:0] is maintained as 0 for two ⅛ chips, and the I and Q channel information are exchanged as Q_1, I_2, I_2, I_2, Q_2, I_2, Q_2, . . . in the MUX 322. Thus, an exchange occurs between FILTER_OUTPUT_I and FILTER_OUTPUT_Q for 1 chip, as indicated in black stripes.

SUMMARY OF THE INVENTION

An object of the present invention is to substantially solve at least the above problems and/or disadvantages and to provide at least the advantages below. Accordingly, an object of the present invention is to provide an apparatus and method for preventing distortion in the output of an Finite Impulse Response (FIR) filter caused by the phase slew of a frame reference signal in a User Equipment (UE) that uses the frame reference signal for phase advance or retardation.

Another object of the present invention is to provide an apparatus and method for minimizing transmission errors for one chip caused by the phase slew of a frame reference signal.

The above objects are achieved by an apparatus and method for compensating for data distortion caused by the phase slew of a frame reference signal in UE that accesses an asynchronous Wideband Code Division Multiple Access (WCDMA) communication system.

According to one aspect of the present invention, in the distortion compensating apparatus, an FIR filter receives I channel data and Q channel data having a plurality of chips, multiplies the I/Q channel data by a predetermined filtering coefficient, and outputs the product, in synchronization with the frame reference signal. A phase compensator compensates for an I-Q channel exchange occurring at an output end of the FIR filter when the phase of the frame reference signal is advanced or retarded.

According to another aspect of the present invention, in the distortion compensating method, I channel data and Q channel data having a plurality of chips are received and the I/Q channel data is multiplied by a predetermined filtering coefficient, for filtering, in synchronization with the frame reference signal. An I-Q channel exchange occurring in the filtered data is compensated for when the phase of the frame reference signal is advanced or retarded.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will be described herein below with reference to the accompanying drawings. In the following description, well-known functions or constructions are omitted for conciseness.

The embodiment of the present invention is intended to prevent data distortions in a Finite Impulse Response (FIR) filter caused by the phase slew of a frame reference signal in an asynchronous Wideband Code Division Multiple Access (WCDMA) communication system. Particularly, the embodiment of the present invention further uses a phase compensator at the output end of an Square Root Raised Cosine (SRRC) filter of a digital modulator in a UE transmitter, for compensating for the phase slew.

Figure 1:
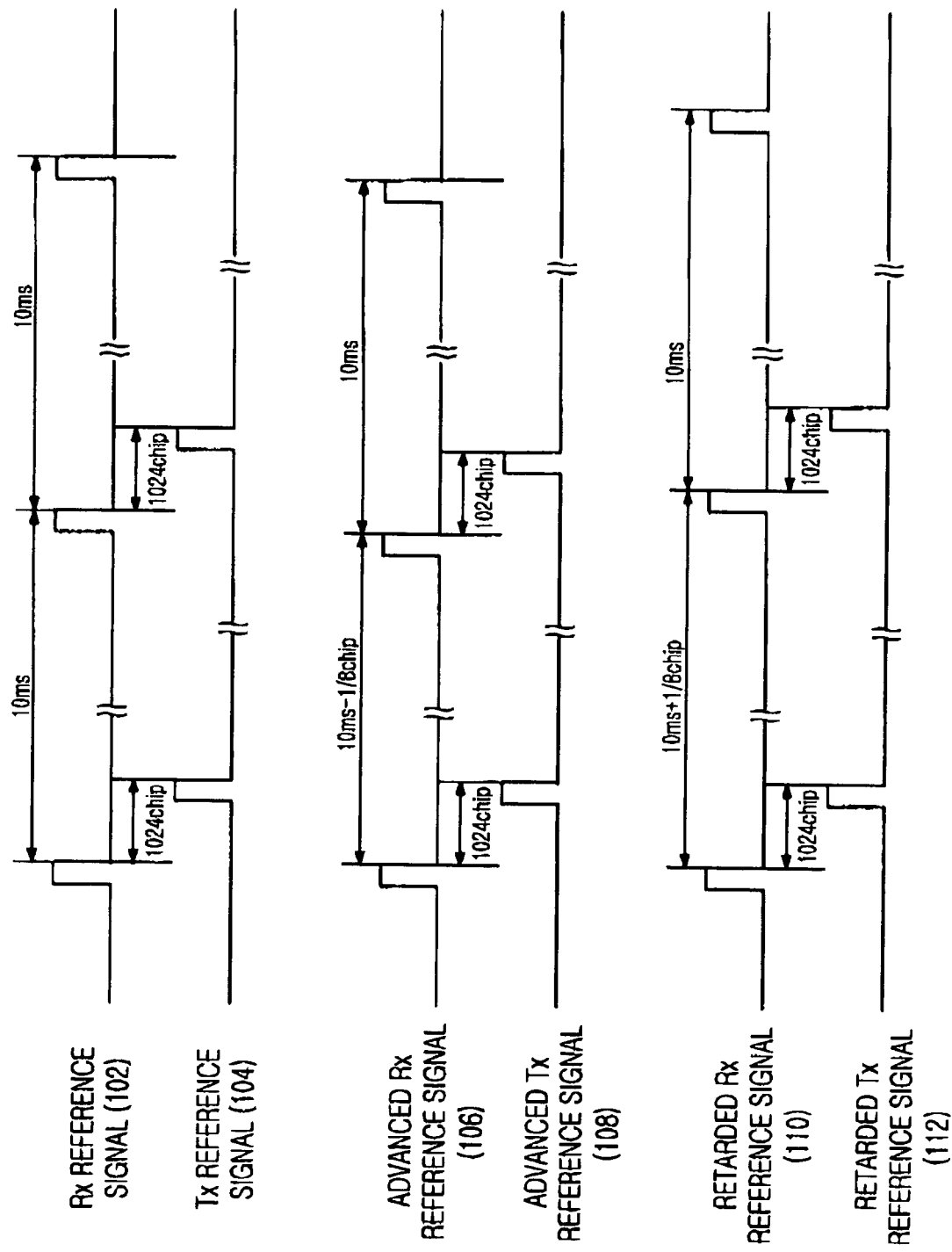
FIG. 1 is a timing diagram illustrating an example of Transmission (Tx) and Reception (Rx) frame reference signals in a User Equipment (UE) that accesses a conventional asynchronous Code Division Multiple Access (CDMA) communication system.
Figure 2:
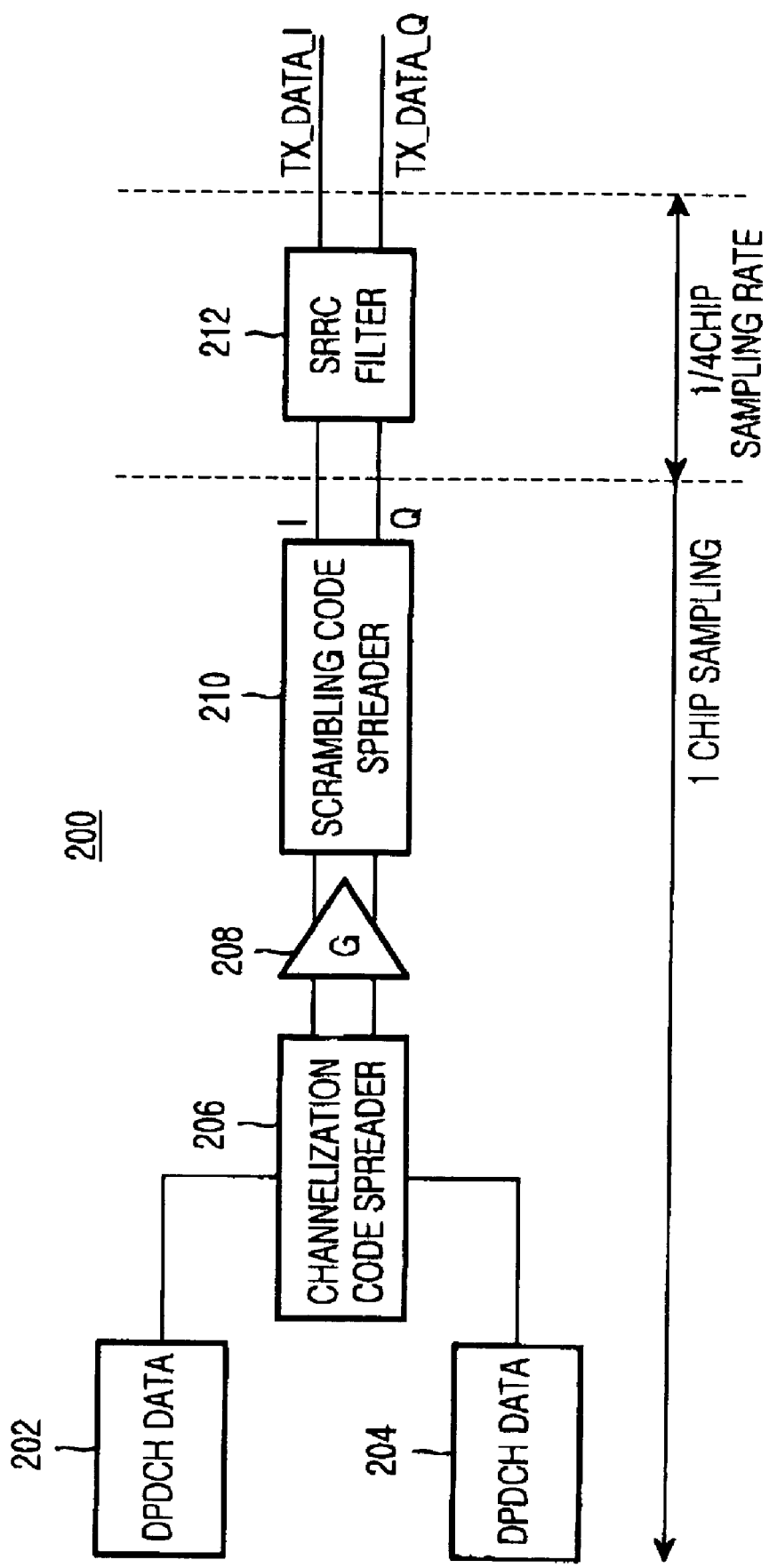
FIG. 2 is a block diagram illustrating an example of a digital modulator in the UE that accesses the conventional asynchronous CDMA communication system.
Figure 3:
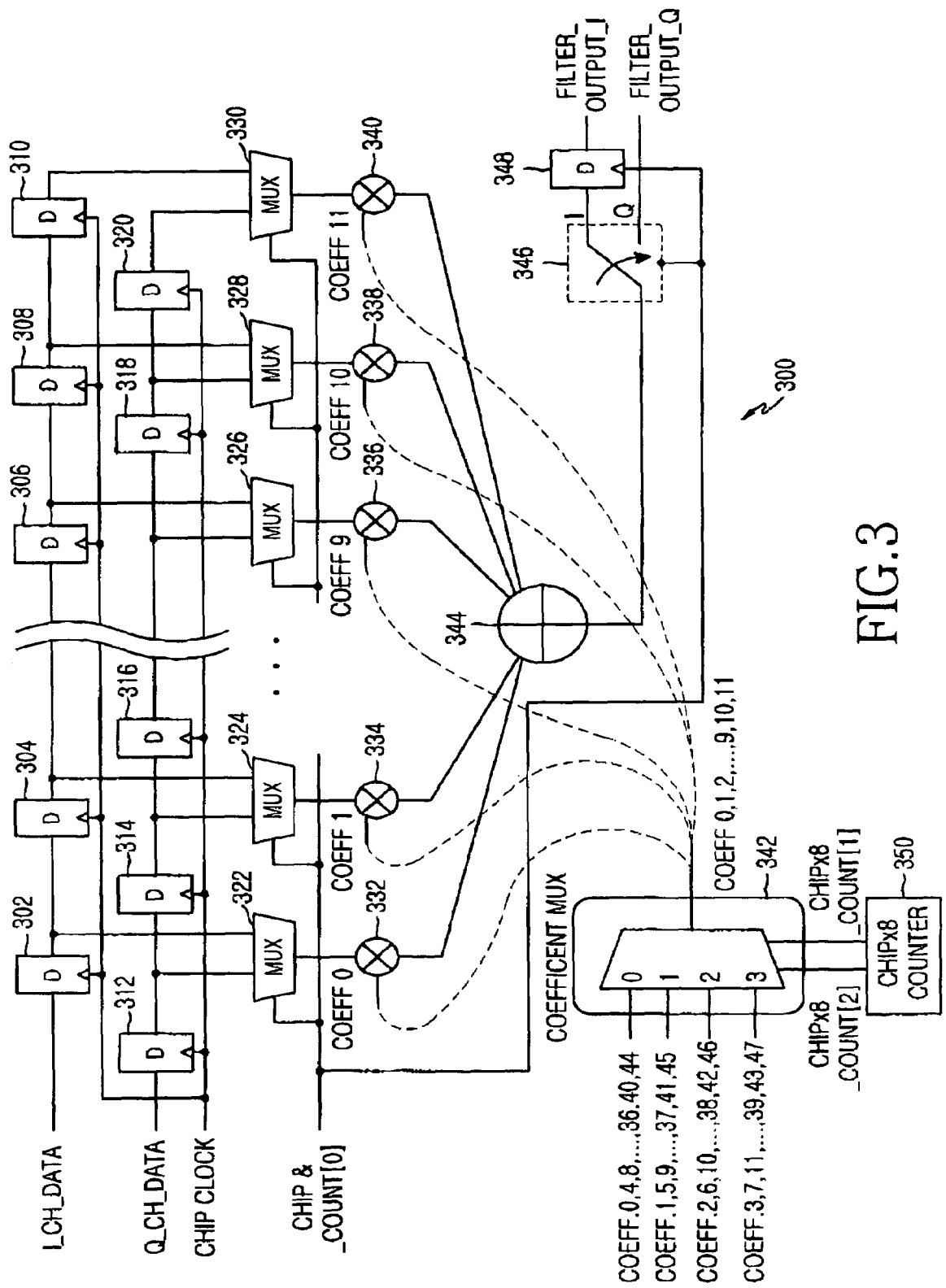
FIG. 3 is a block diagram illustrating an example of the structure of a conventional Square Root Raised Cosine (SRRC) filter.
Figure 4:
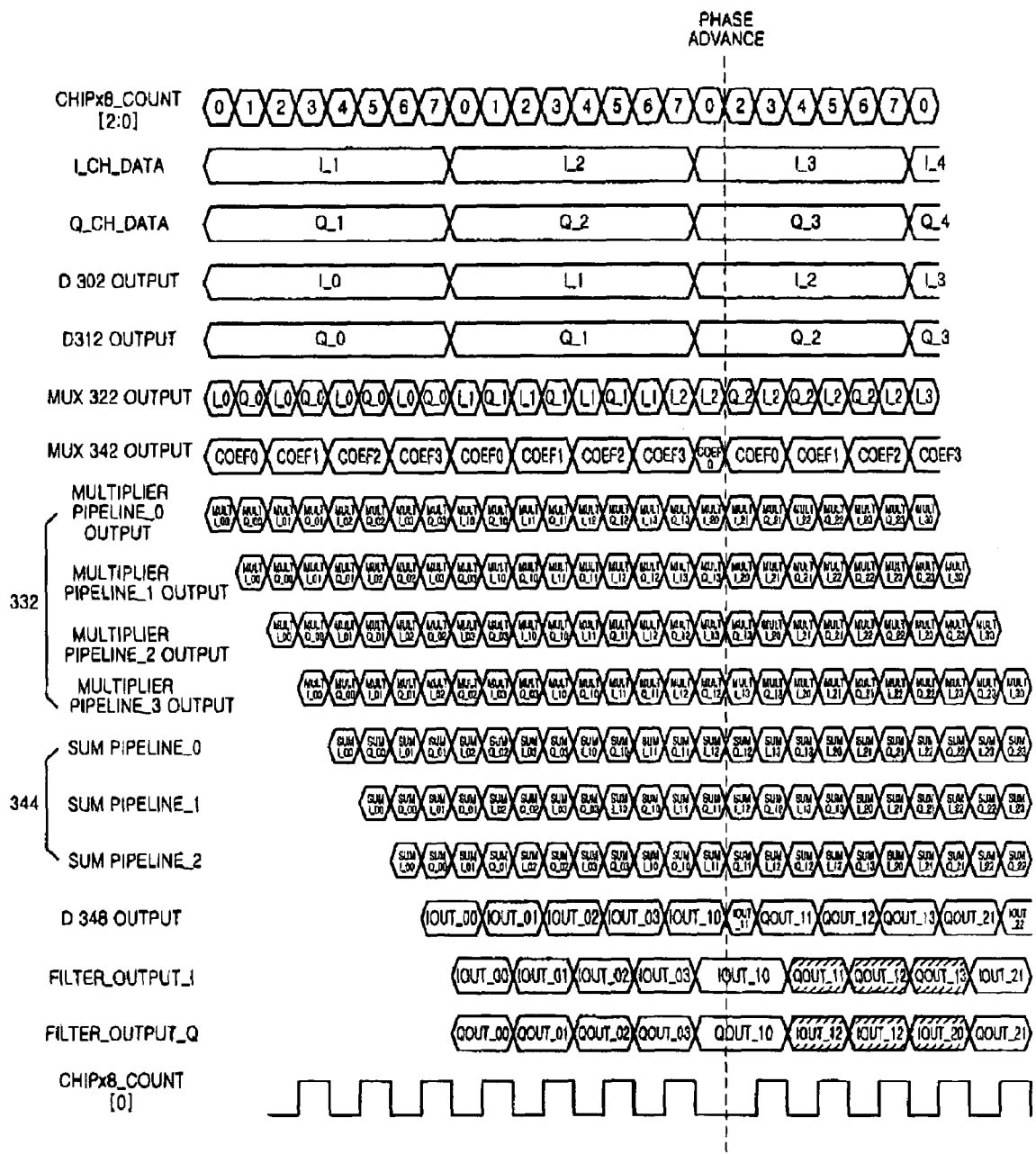
FIG. 4 is a timing diagram illustrating an example of an output distortion caused by a phase advance in the conventional SRRC filter.
Figure 5:
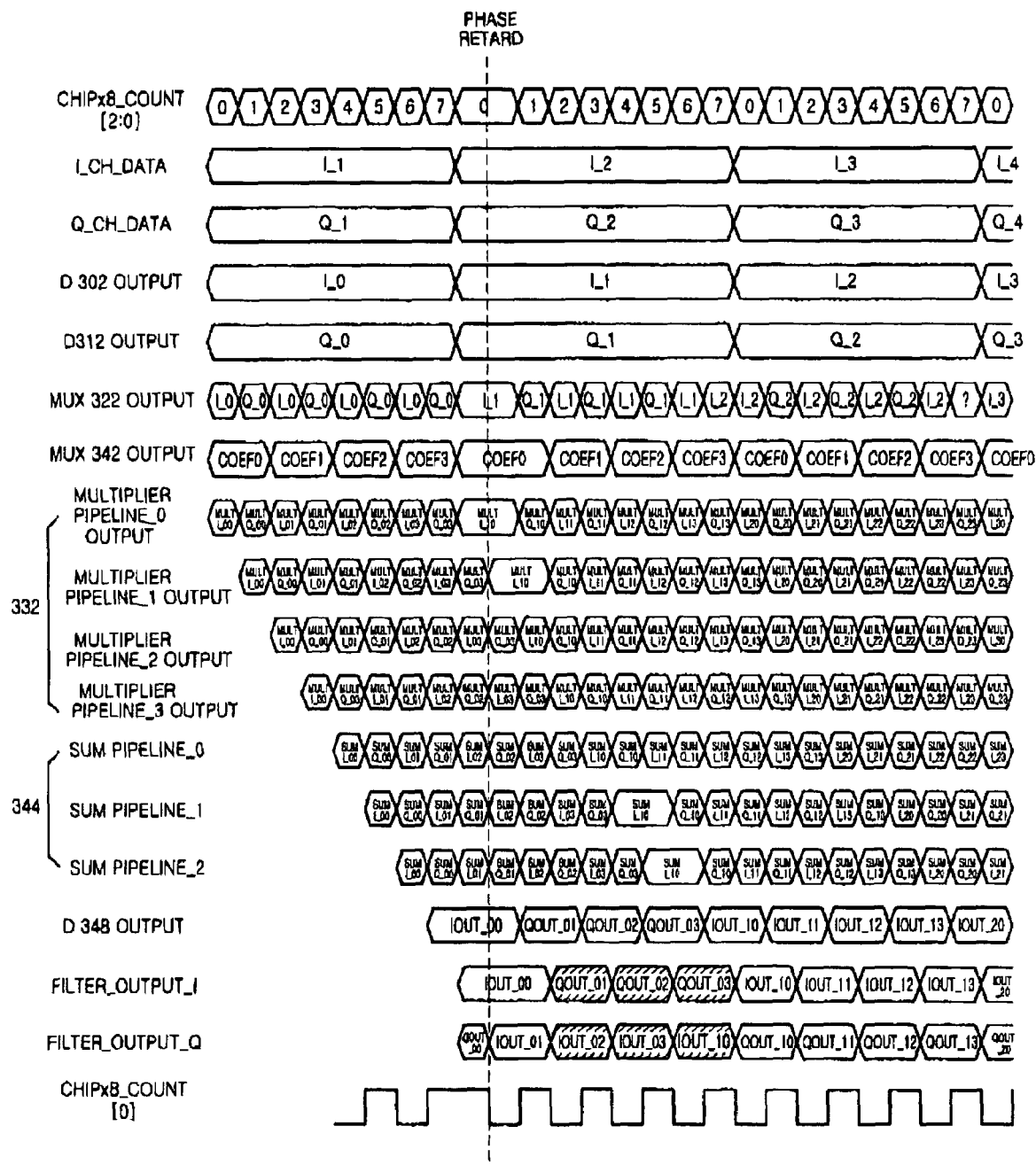
FIG. 5 is a timing diagram illustrating an example of an output distortion caused by a phase retardation in the conventional SRRC filter.
Figure 6:
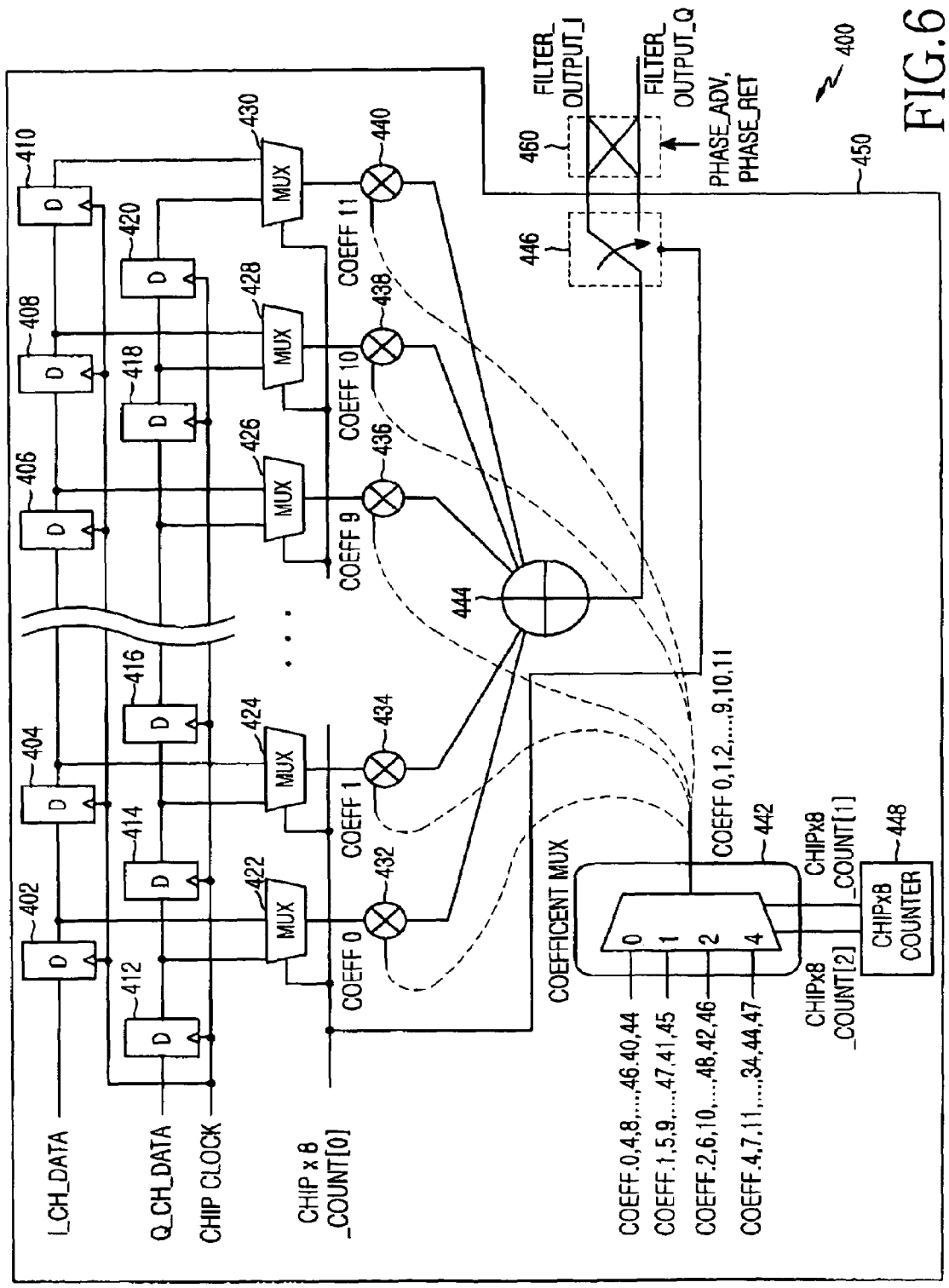
FIG. 6 is a block diagram illustrating an example of the structure of a symbol compensator according to an embodiment of the present invention.

FIG. 6 is a is a block diagram illustrating an example of the structure of a symbol compensator according to an embodiment of the present invention. Referring to FIG. 6, a symbol compensator 400 included in a digital modulator of a User Equipment (UE) transmitter comprises an SRRC filter 450 and a phase compensator 460.

The SRRC filter 450 includes serially-connected delays 402, 404, 406, 408 and 410 each for delaying I channel data, I_CH_DATA by one chip, serially-connected delays 412, 414, 416, 418 and 420 each for delaying Q channel data, Q_CH_DATA by one chip, MUXs 422, 424, 426, 428 and 430 each for selecting I or Q channel data every ⅛ chip, a coefficient MUX 442 for selecting a filtering coefficient for the selected I/Q channel data every ¼ chip, 4-pipeline multipliers 432, 434, 436, 438 and 440 each for multiplying the selected I/Q channel data by the selected-coefficient, a 3-pipe line summer 444 for summing the outputs of the multipliers 432, 434, 436, 438 and 440, a selector 446 for alternately selecting the I and Q channel sums every ⅛ chip, and a CHIP×8 COUNTER 448 for generating count signals CHIP× 8_COUNT[0], [1], [2] to be fed to the MUXs 422, 424, 426, 428 and 430 and the coefficient MUX 442. Here, CHIP× 8_COUNT[0] serves as a ⅛-chip clock signal, CHIP× 8_CLOCK.

Figure 7:
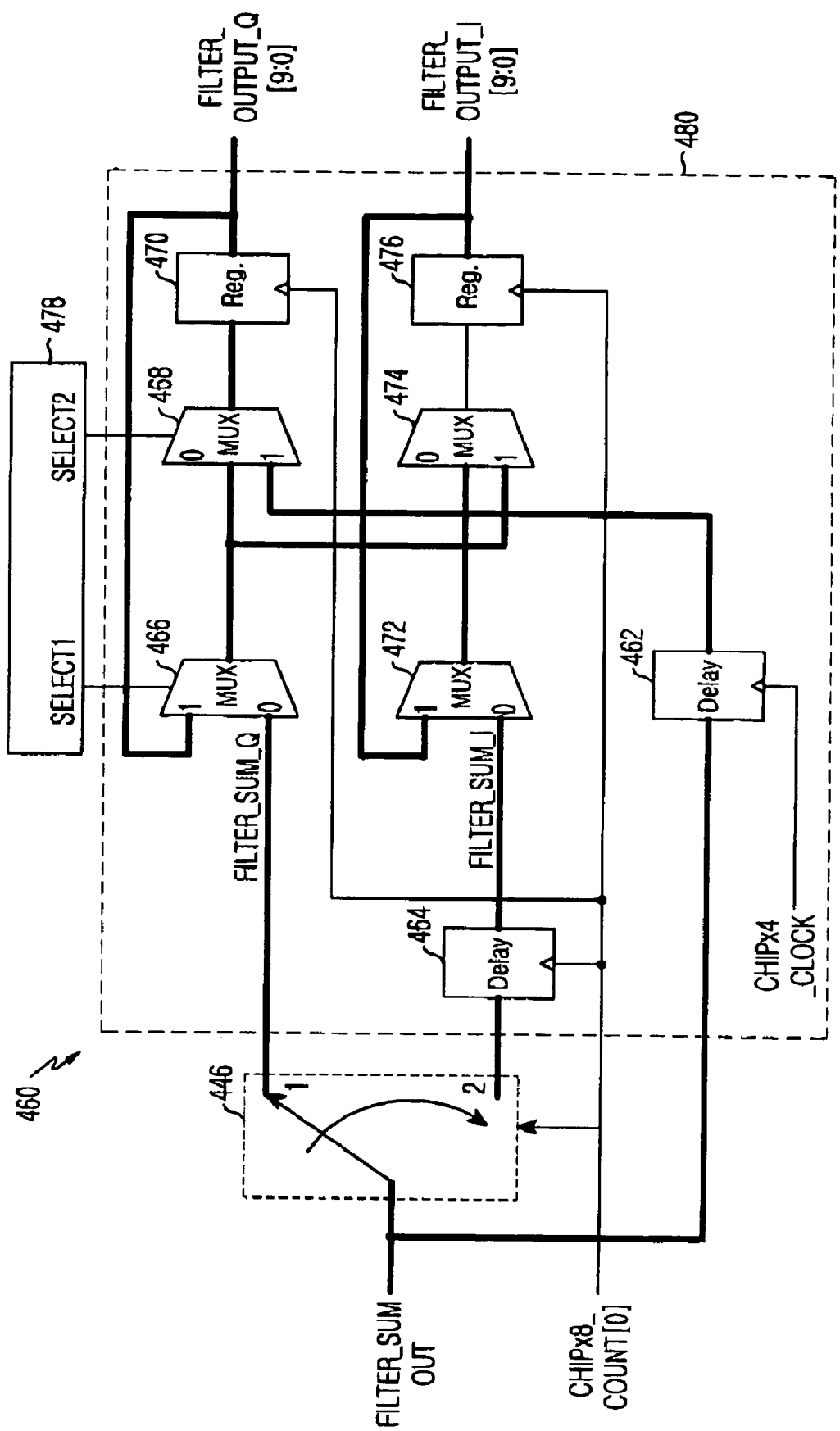
FIG. 7 is a detailed block diagram illustrating an example of the structure of a phase compensator for exchanging I and Q channel data when an SRRC filter output is delayed or its phase is slewed according to an embodiment of the present invention.
Figure 8:
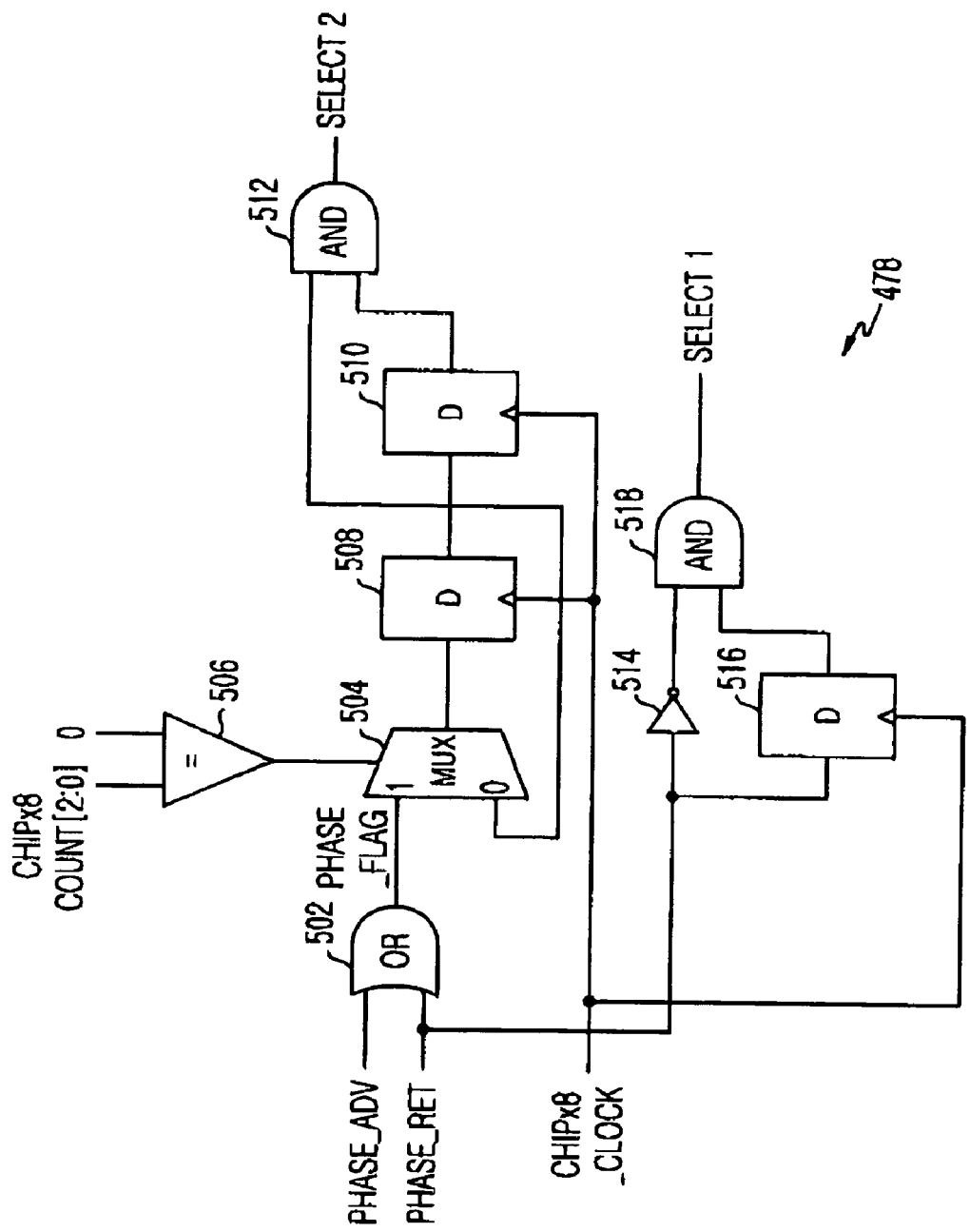
FIG. 8 is a detailed block diagram illustrating an example of the structure of a select signal generator for generating select signals to control the phase compensator according to an embodiment of the present invention.

A detailed structure of the phase compensator 460 is illustrated in FIGS. 7 and 8. FIG. 7 is a detailed block diagram illustrating an example of the phase compensator 460 for exchanging I and Q channel data when the output of the SRRC filter 450 is delayed or its phase is slewed, and FIG. 8 is a detailed block diagram illustrating an example of a select signal generator 478 for generating select signals by which the phase compensator 460 is controlled.

In FIG. 7, components other than the select signal generator 478 collectively form an I/Q channel converter 480. It is assumed that the I/Q channel converter 480 includes the selector 446.

Referring to FIG. 7, the sum data, FILTER_SUM output from the summer 444 in the SRRC filter 450 is provided to the selector 446, while being stored in a first delay 462 for a ¼ chip so that when a ⅛-chip phase advance or retardation occurs, the ¼ chip-earlier sum data can be used as a Q channel output. The selector 446 switches FILTER_SUM output alternately to a first output (Q channel output) and a second output (I channel output) in response to the LSB of CHIP× 8_COUNT, CHIP×8_COUNT[0].

MUXs 466, 472, 468 and 474 change the flows of I and Q channel data when a phase slew occurs. They are controlled by a first select signal (SELECT1) and a second select signal (SELECT2) received from the select signal generator 478. SELECT 1 is set to 1 for one chip only when a ⅛-chip phase retardation occurs, while SELECT 2 is set to 1 for one chip in both cases of phase advance and retardation.

The first MUX 466 has a first input connected to the first output of the selector 446 and a second input connected to a feedback Q channel output, FILTER_OUTPUT_Q from the final output end. The third MUX 472 has a first input connected to the second output of the selector 446 and a second input connected to a feedback I channel output, FILTER_ OUTPUT_I from the final output end. The first and third MUXs 466 and 472 are controlled by select1.

The second MUX 468 has a first input connected to the output of the first MUX 466 and a second input connected to the ¼-chip earlier sum data delayed in the first delay 462. The fourth MUX 474 has a first input connected to the output of the second MUX 472 and a second input connected to the output of the first MUX 466. The second and fourth MUXs 468 and 474 are controlled by SELECT2.

First and second registers 470 and 476 accumulate data from the second and fourth MUXs 468 and 474, respectively and output them as final I channel and Q channel data, FIL-TER_OUTPUT_I and FILTER_OUTPUT_Q, in response to the inverse of CHIP×8_COUNT[0].

FIG. 8 is a detailed block diagram illustrating an example of the structure of the select signal generator 478 for controlling the phase compensator 460 according to the embodiment of the present invention. When a ⅛-chip phase advance or retardation occurs, the select signal generator 478 generates SELECT1 and SELECT2 required to compensate for the phase advance or retardation in the phase compensator 460.

Referring to FIG. 8, an OR gate 502 generates a phase flag, PHASE_FLAG indicating the occurrence of phase advance or retardation. A comparator 506 and a MUX 504 select a phase compensation time point according to the three least significant bits of CHIP×8_COUNT, CHIP×8_COUNT[2:0]. Delays 508 and 510 and an AND gate 512 generate SELECT2 for a ⅛ chip using PHASE_FLAG, and an inverter 514, a delay 516, and an AND gate 518 generate SELECT1 for one chip using a phase retardation signal, PHASE_RET.

SELECT1 and SELECT2 are produced by combining a phase advance signal, PHASE_ADV with the phase retardation signal, PHASE_RET. The OR gate 502 generates PHASE_FLAG by performing a logical OR operation on PHASE_ADV and PHASE_RET. The comparator 506 compares CHIP×8_COUNT[2:0] with 0 to reflect PHASE_FLAG in phase compensation only at a predetermined time. If they are equal, the comparator 506 outputs a 1, and if they are different, it outputs a 0.

The first delay 508 delays the output of the MUX 504 by a ⅛ chip. The first MUX 504 selects one of the current PHASE_ FLAG from the OR gate 502 and the feedback PHASE_ FLAG from the first delay 508 according to the comparison and provides the selected one to the first delay 508. Since the output of the first delay 508 is fed back to the second input of the first MUX 504, PHASE_FLAG is delayed for one chip in the first delay 508 until CHIP×8_COUNT[2:0] becomes 0.

The second delay 510 delays the output of the first delay 508 by a ⅛ chip. The AND gate 512 then generates SELECT2 by performing a logical AND operation on the 1-chip delayed PHASE_FLAG from the first delay 508 and the 1+⅛-chip delayed PHASE_FLAG from the second delay 510.

The inverter 514 inverts PHASE_RET and the third delay 516 delays PHASE_RET by a ⅛ chip. The AND gate 518 generates SELECT1 by performing a logical AND operation on the inverted PHASE_RET from the inverter 514 and the ⅛-chip delays PHASE_RET from the third delay 516.

Symbol compensation in the above structure in the cases of phase retardation and phase advance will be described in detail.

When the receiver retards the phase of the Rx frame reference signal due to inter-cell movement of the UE, it notifies the digital modulator of the transmitter of the phase retardation by PHASE_RET. Then the select signal generator 478 sets SELECT1 and SELECT2.

For one ⅛-chip cycle with SELECT1 set to 1 and SELECT2 set to 0, the first and third MUXs 466 and 472 select the feedback I and Q outputs, FILTER_OUTPUT_I and FILTER_OUTPUT_Q. The first and second registers 470 and 476 store the outputs of the first and third MUXs 466 and 472 via the second and fourth MUXs 468 and 474. The first and second registers 470 and 476 outputs the stored values as the final I and Q channel values, FILTER_OUTPUT_I and FILTER_OUTPUT_Q, in response to the inverse of CHIP×8_COUNT[0].

In the next cycle, select1 is set to 0 and SELECT2 is set to 1. Thus, the second MUX 468 outputs ¼ chip-earlier sum data received from the first delay 462 as the final Q channel value, FILTER_OUTPUT_Q through the first register 470. The fourth MUX 476 outputs Q channel sum data selected by the selector 446 as the final I channel value, FILTER_OUTPUT_I through the second register 476.

Output distortion occurs during phase retardation because the selector 446 is controlled by CHIP×8_COUNT[0] only and thus exchanges the I and Q channel data at the phase retardation. Therefore, when the phase retardation occurs, the final output is compensated with the output of the first delay 462 which is not influenced by CHIP×8_COUNT. That is, the output of the first delay 464 is used as FILTER_OUTPUT_Q and the second output of the selector 464 is used as FILTER_OUTPUT_I, using the data of the first delay 462 and I channel sum data at the second output of the selector 464 for one chip at the phase retardation. Hence, the I and Q channel exchange is compensated for.

When the receiver advances the phase of the Rx frame reference signal, it notifies the digital modulator of the transmitter of the phase retardation by PHASE_ADV. Thus, as SELECT1 is fixed at 0 and SELECT2 is set to 1, ¼ chip-earlier sum data from the first delay 464 is FILTER_OUTPUT_Q, while Q channel sum data at the first output of the selector 446 is FILTER_OUTPUT_I.

As in the phase retardation, the first delay 462 is used at the phase advance. Using I channel sum data at the second output of the selector 446 for one chip, the output of the first delay 462 is connected to the final Q channel output, and Q channel sum data at the first output of the selector 446 is connected to the final I channel output. Consequently, instead of the distortion of 4 samples on each of the I and Q channels for one chip, the last sample of 4 samples per chip is lost at the final output end.

Figure 9:
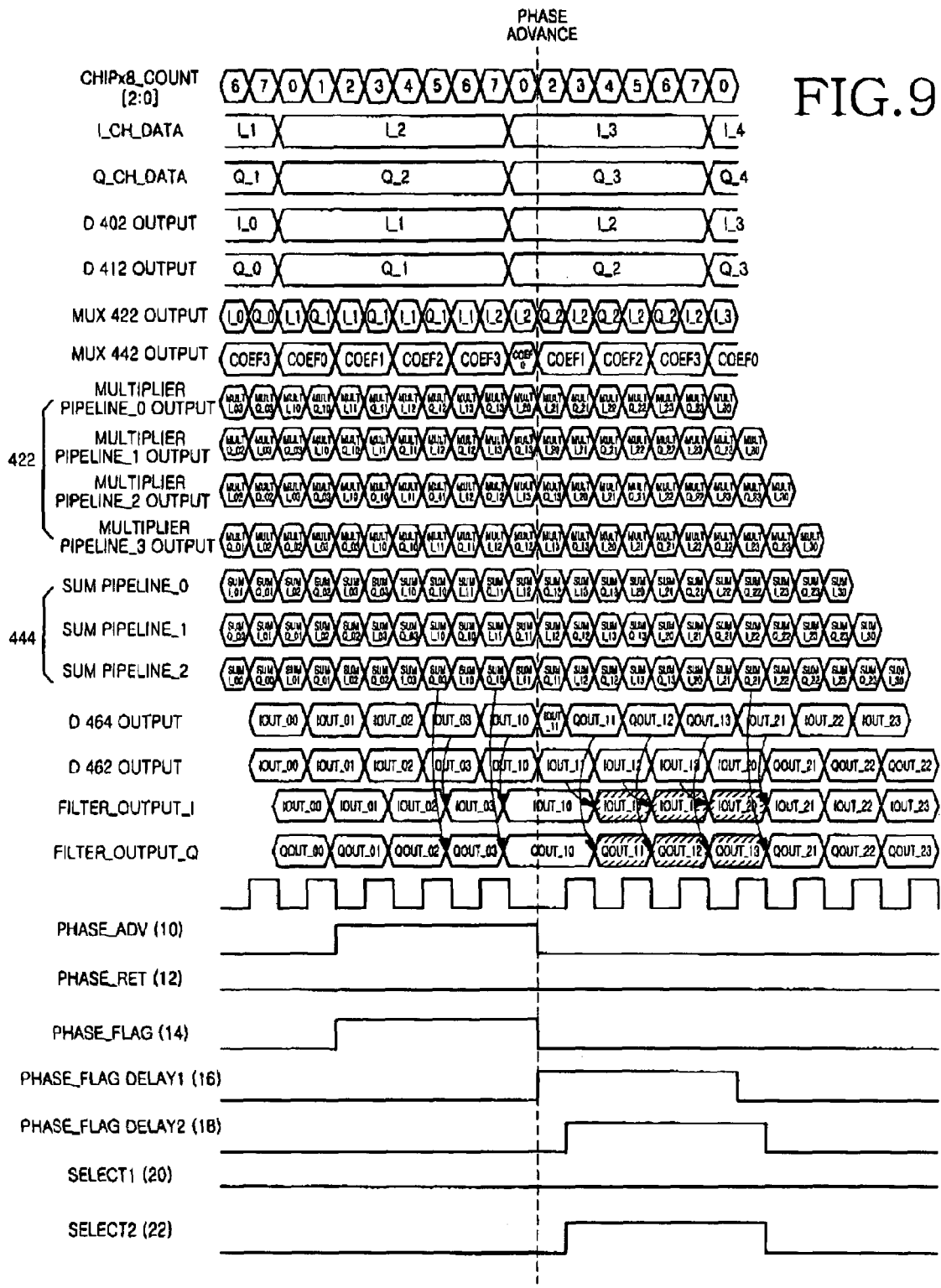
FIG. 9 is a timing diagram illustrating an example of the symbol compensator including the SRRC filter and the phase compensator when a phase advance occurs according to an embodiment of the present invention.
Figure 10:
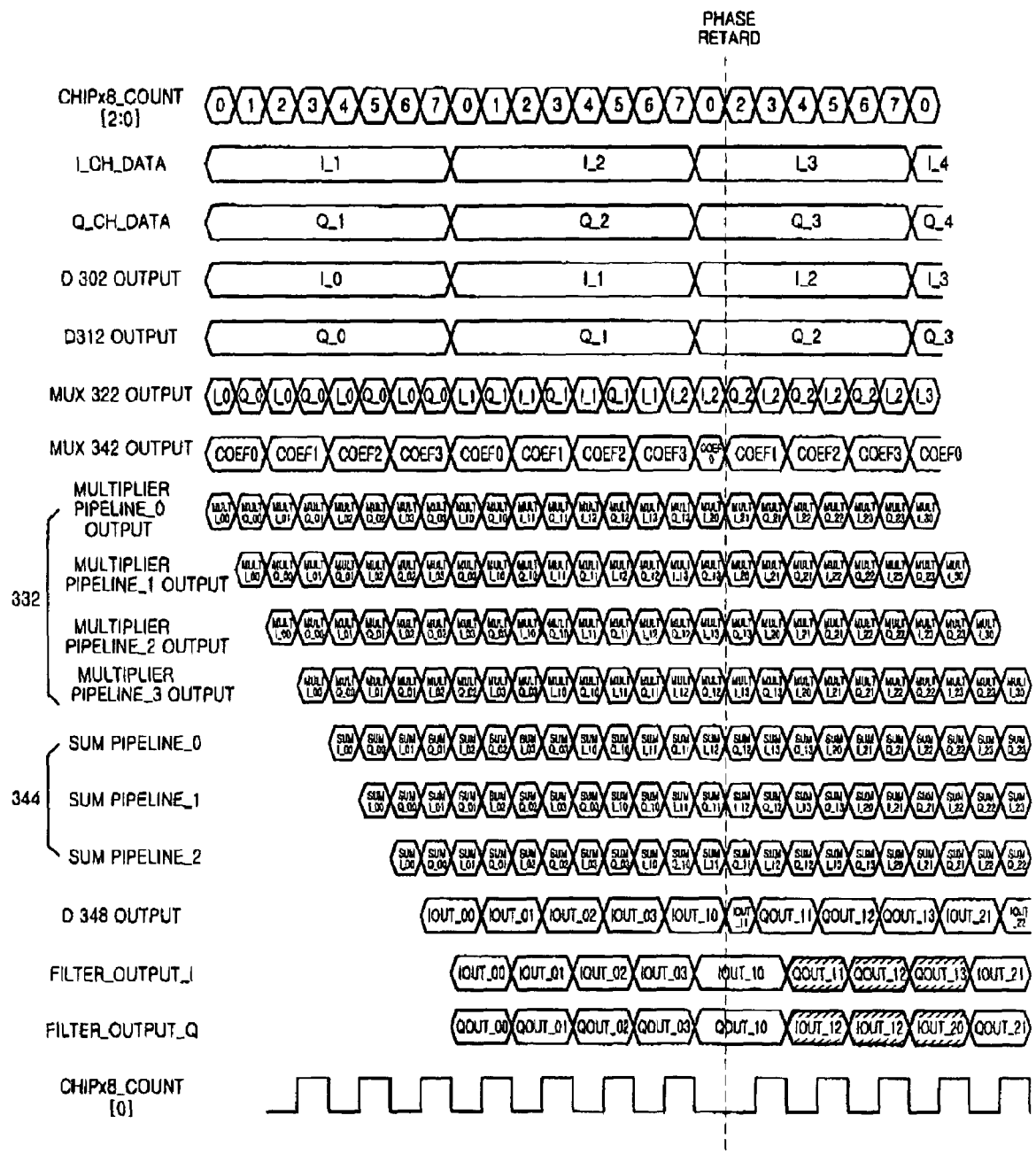
FIG. 10 is a timing diagram illustrating an example of the symbol compensator when a phase retardation occurs according to an embodiment of the present invention.

FIGS. 9 and 10 illustrate timing of an output signal of each logic and the select signals in the symbol compensator according to the embodiment of the present invention. FIG. 9 is a timing diagram illustrating an example of a phase advance in the symbol compensator 400 including the SRRC filter 450 and the phase compensator 460, and FIG. 10 is a timing diagram illustrating an example of a phase retardation in the symbol compensator 400.

In FIG. 9, SELECT2 22 controls the final output. When a phase advance occurs, PHASE_ADV 10 is set to 1 for one chip and PHASE_RET 12 is maintained as 0. Thus, PHASE_FLAG 14 obtained by performing a logical OR operation on PHASE_ADV 10 and PHASE_RET 12 is 0 for the one chip. When PHASE_FLAG 14 falls to 0 from 1, the phase advance actually affects the SRRC filtering. A first phase flag delay signal is produced by delaying PHASE_FLAG 14 through the MUX 504 and the delay 508, PHASE_FLAG_DELAY1 16 and a second phase flag delay signal, PHASE_FLAG_DELAY2 18 is produced by delaying PHASE_FLAG_DELAY1 16 by a ⅛ chip in the delay 510. SELECT2 22 is generated by performing a logical AND operation on PHASE_FLAG_DELAY1 16 and PHASE_FLAG_DELAY2 18 in the AND gate 512. At the phase advance, SELECT1 20 is maintained at 0.

In response to SELECT1 20 and SELECT2 22, Q channel sum data, that is, the Q channel output of the summer 444 selected by the selector 446 is FILTER_OUTPUT_I, while ¼ chip-earlier sum data from the delay 462 is FILTER_OUTPUT_Q, for the phase advance period.

In FIG. 10, when a phase retardation occurs, PHASE_ADV 24 is maintained as 0 and PHASE_RET 26 is set to 1 for one chip. SELECT2 36 is generated using PHASE_FLAG 28 in the same manner as the phase advance. Meanwhile, CHIP×8_COUNT is 0, PHASE_RET 26 is stored in the third delay 156. SELECT1 34 is set to 1 for the one cycle by performing a logical OR operation on the output 32 of the third delay 5126 and the output 30 of the inverter 514.

In response to SELECT1 34 and SELECT2 36, Q channel sum data, that is, the Q channel output of the summer 444 selected by the selector 446 is FILTER_OUTPUT_I, while ¼ chip-earlier sum data from the delay 462 is FILTER_OUTPUT_Q, for the phase retardation period.

In accordance with the embodiment of the present invention, the phase retardation or advance of a frame reference signal is compensated for at the final end of the SRRC filter in order to minimize the distortion of 4 over-samples per chip at the final end of the FIR filter, caused by the phase slew of the frame reference signal in UE. Since the 4-sample distortion for one chip is minimized to the loss of one sample at the phase advance, data can be transmitted more accurately.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for compensating for data distortion caused by the phase slew of a frame reference signal in a user equipment (UE) that accesses an asynchronous wideband code division multiple access (WCDMA) communication system, comprising:
 a finite impulse response (FIR) filter for receiving in-phase (I channel) data and quadrature-phase (Q channel) data having a plurality of chips, multiplying the I/Q channel data by a predetermined filtering coefficient, and outputting the product, in synchronization with the frame reference signal; and
 a phase compensator for compensating for an I-Q channel exchange occurring at an output end of the FIR filter in response to advancing or retarding the frame reference signal.

2. The apparatus of claim 1, wherein the phase compensator delays the output of the FIR filter by a predetermined number of chips and outputs the delayed signal as a final Q channel value when the phase of the frame reference signal is advanced or retarded.

3. The apparatus of claim 1, wherein the phase compensator comprises:
 a select signal generator for detecting a ⅛-chip advance or retardation in the phase of the frame reference signal and generating first and second select signals indicating the time point of the phase advance or retardation; and
 an I/Q channel converter for connecting previous output data of the FIR filter to a Q channel output end and the current output data of the FIR filter to an I channel output end according to the first and second select signals when the phase of the frame reference signal is advanced or retarded.

4. The apparatus of claim 3, wherein the first select signal is set to a 1 for a ⅛ chip when the phase retardation occurs, and the second select signal is set to a 1 for one chip when the phase advance or retardation occurs.

5. The apparatus of 4, wherein the I/Q channel converter comprises:
 a selector for alternately switching the output of the FIR filter to an I channel output and a Q channel output every ⅛ chip;
 a first delay for delaying the output of the FIR filter by a ¼ chip;
 a first multiplexer (MUX) for selecting the Q channel output of the selector or a previous final Q channel value according to the first select signal;
 a second MUX for selecting the output of the first MUX or the output of the first delay according to second select signal;
 a second delay for delaying the I channel output of the selector by a ⅛ chip;
 a third MUX for selecting the output of the second delay or a previous final I channel value according to the first select signal; and
 a fourth MUX for selecting the output of the third MUX or the output of the first MUX according to the second select signal and outputting the selected data as a final I channel value.

6. The apparatus of claim 5, further comprising a first register for accumulating the output of the second MUX, and outputting the accumulated data as the final Q channel value and feeding back the accumulated data to the first MUX in response to the inverse of a ⅛ chip clock signal.

7. The apparatus of claim 6, further comprising a second register for accumulating the output of the fourth MUX, and outputting the accumulated data as the final I channel value and providing the accumulated data to the third MUX in response to the inverse of a ⅛ chip clock signal.

8. The apparatus of claim 4, wherein the select signal generator comprises:
 an OR gate for performing a logical OR operation on a phase advance signal which is indicative of the phase advance of the frame reference signal and a phase retardation signal which is indicative of the phase retardation of the frame reference signal;
 a MUX for selecting a first input connected to the output of the OR gate at each boundary of one chip;
 a first delay for delaying the output of the MUX by a ⅛ chip and providing the delayed data as a second input of the MUX;
 a second delay for delaying the output of the first delay b a ⅛ chip;
 a first AND gate for generating the second select signal by performing a logical AND operation on the outputs of the first and second delays;
 an inverter for inverting the phase retardation signal;
 a third delay for delaying the phase retardation signal by a ⅛ chip; and
 a second AND gate for generating the first select signal by performing a logical AND-operation on the inverted phase retardation signal with the delayed phase retardation signal.

9. The apparatus of claim 1, wherein the FIR filter comprises an Square Root Raised Cosine (SRRC) filter.

10. A method of compensating for data distortion caused by the phase slew of a frame reference signal in a user equipment (UE) that accesses an asynchronous wideband code division multiple access (WCDMA) communication system, comprising the steps of:
 receiving in-phase (I channel) data and quadrature-phase (Q channel) data having a plurality of chips, and multiplying the I/Q channel data by a predetermined filtering coefficient, for filtering, in synchronization with the frame reference signal; and
 compensating for an I-Q channel exchange occurring in the filtered data in response to advancing or retarding the frame reference signal.

11. The method of claim 10, wherein the filtered data is delayed by a predetermined number of chips and used as a final Q channel value when the phase of the frame reference signal is advanced or retarded, in the compensation step.

12. The method of claim 10, wherein the compensation step comprises the steps of:
 detecting a ⅛-chip advance or retardation in the phase of the frame reference signal and generating first and select signals, the first select signal being set to a 1 for a ⅛ chip from the time when the phase retardation occurs and the second select signal being set to a 1 for one chip when the phase advance or retardation occurs; and
 outputting previous filtered data as a final Q channel value and outputting current filtered data as a final I channel value according to the first and second select signals when the phase of the frame reference signal is advanced or retarded.

* * * * *